United States Patent
Sun et al.

(10) Patent No.: US 9,323,012 B1
(45) Date of Patent: Apr. 26, 2016

(54) HYBRID INTEGRATED OPTICAL DEVICE WITH HIGH ALIGNMENT TOLERANCE

(71) Applicant: LaXense Inc., Walnut, CA (US)

(72) Inventors: Xiaochen Sun, Chino Hills, CA (US); Ningning Feng, Arcadia, CA (US)

(73) Assignee: LAXENSE INC., Walnut, CA (US)

( * ) Notice: Subject to any disclaimer, the term of this patent is extended or adjusted under 35 U.S.C. 154(b) by 0 days.

(21) Appl. No.: 14/524,411

(22) Filed: Oct. 27, 2014

(51) Int. Cl.
*G02B 6/12* (2006.01)
*G02B 6/42* (2006.01)

(52) U.S. Cl.
CPC ............... *G02B 6/423* (2013.01); *G02B 6/425* (2013.01); *G02B 6/4238* (2013.01)

(58) Field of Classification Search
CPC ........................................................ G02B 6/423
See application file for complete search history.

(56) References Cited

U.S. PATENT DOCUMENTS

| | | | |
|---|---|---|---|
| 5,499,312 A | 3/1996 | Hahn et al. | |
| 5,621,837 A * | 4/1997 | Yamada | G02B 6/42 385/88 |
| 6,250,819 B1 * | 6/2001 | Porte | G02B 6/4224 385/130 |
| 6,293,688 B1 | 9/2001 | Deacon et al. | |
| 6,391,214 B1 | 5/2002 | Kovaclc et al. | |
| 6,693,936 B2 | 2/2004 | Kitaoka et al. | |
| 6,832,013 B1 * | 12/2004 | Kuhmann | G02B 6/12004 385/129 |
| 6,841,860 B2 | 1/2005 | Lee et al. | |
| 7,522,648 B2 | 4/2009 | Park et al. | |
| 8,285,150 B2 * | 10/2012 | Bai | H04B 10/506 398/142 |
| 8,798,409 B2 | 8/2014 | Pardo et al. | |
| 2002/0197010 A1 | 12/2002 | Kato et al. | |
| 2003/0152338 A1 * | 8/2003 | Kuhara | G02B 6/42 385/89 |
| 2003/0223707 A1 * | 12/2003 | Nakanishi | G02B 6/3636 385/92 |
| 2004/0057653 A1 * | 3/2004 | Fukuda | G02B 6/124 385/14 |
| 2008/0080866 A1 * | 4/2008 | Bai | H04J 14/02 398/87 |
| 2014/0023313 A1 * | 1/2014 | Kim | G02B 6/12 385/14 |
| 2014/0294341 A1 * | 10/2014 | Hatori | G02B 6/12 385/14 |

OTHER PUBLICATIONS

Goodwill et al., "Polymer Tapered Waveguides and Flip-Chip Solder Bonding as Compatible Technologies for Efficient OEIC Coupling", 1997, Electronic Components and Technology Conference, IEEE.

(Continued)

*Primary Examiner* — Sung Pak
(74) *Attorney, Agent, or Firm* — Chen Yoshimura LLP

(57) ABSTRACT

An optical device including an optical bench and an optical chip, the optical bench having multiple optical waveguides formed on its first side and the optical chip has multiple optical waveguides formed on its first side. The optical chip is flip-chip bonded onto the optical bench with its first side facing the first side of the optical bench. The distance between adjacent waveguides on the optical bench are designed to be slightly different from the distance between adjacent waveguides on the optical chip, where the latter usually is a pre-designed value under certain conventions. The difference amount is properly designed such that under reasonable misalignment between the optical chip and the optical bench in the in-plane direction perpendicular to waveguide propagation one can always find that one of the multiple waveguides is aligned sufficiently well with the corresponding waveguide on the optical chip.

13 Claims, 4 Drawing Sheets

(56) References Cited

OTHER PUBLICATIONS

Dahms et al., "Self-Aligned Laser-Fiber Coupling Using Tin/Gold (20/80) Solder on Micro-Optical Silicon Benches", 2000, Proceedings of SPIE, vol. 3952.

Thacker et al, "Flip-Chip Integrated Silicon Photonic Bridge Chips for Sub-Picojoule Per Bit Optical Links", 2010, Electronic Components and Technology Conference.

* cited by examiner

HYBRID INTEGRATED OPTICAL DEVICE WITH HIGH ALIGNMENT TOLERANCE

BACKGROUND OF THE INVENTION

1. Field of the Invention

The invention relates to an optical device with hybrid integrated optical waveguide chips. In particular, the invention relates to an optical device using flip-chip method to hybrid integrate one or more optical chips on an optical bench and both the chips and the optical bench include multiple optical waveguides with different distances to compensate for alignment errors.

2. Description of the Related Art

Optical interconnects are adopted in data communications at unprecedented rate as more bandwidth and longer transmission reach are required by mega datacenters for applications from social networks, cloud service, to big data analysis and high performance computing. Unlike optical transceiver modules or subsystems made of ultrahigh performance discrete components in telecommunications, lower cost, more compact and more power efficient optical transceivers or engines are demanded in data communications. Integrating multiple optical components or chips such as lasers, modulators, photodetectors, switches, attenuators and etc. on an optical bench chip to form a hybrid integrated optical device is one way to reduce assembling cost and footprint.

In such hybrid integrated optical devices, passively placing and bonding the optical chips on optical benches is highly preferred as it enables automated low cost assembling for massive volume production required by huge data communications market. However, unlike the mature integrated circuit (IC) fully automated packaging processes, assembling these optical chips requires very precise alignment in the range of micrometers or less because these chips and optical benches usually include tiny optical waveguides which must be well aligned with each other to form an optical transmission path.

Borrowing from the IC packaging industry, people have been trying to use the tools called flip-chip bonder to bond the optical chips upside down onto an optical bench. Because the optical waveguides are almost always formed on the top side of an optical chip or an optical bench by some semiconductor or other wafer processing techniques, the distance between the optical waveguide and the top surface is well controlled. By placing an optical chip upside down onto an optical bench and with some pre-defined spacer structures on the optical bench, the optical waveguide alignment in the direction perpendicular to the surface (out-of-plane) of the optical chip and the optical bench can be precisely controlled. This flip-chip bonding approach has been widely discussed.

On the other hand, the alignment in the directions parallel to the surface (in-plane) can only be controlled by the flip-chip bonder's accuracy and bonding process control. A modern top-of-the-line flip-chip bonder can achieve a +/−0.5 micrometer alignment accuracy, however, in practice, the bonding involving processes such as thin metal solder melting, adhesive curing and etc. inevitably contributing to final alignment error due to physical movement of the chip under temperature, stress and/or phase changes. The final alignment error ($3\sigma$ confidence interval) is usually +/−2 micrometers or worse from the statistics of our experiment. The alignment in in-plane waveguide propagation direction is relatively tolerant and satisfied with this alignment error while the in-plane direction perpendicular to waveguide propagation requires accurate alignment, especially for small optical waveguides such as those in lasers. To increase the alignment tolerance in this direction, people tried to include either a taper structure at the end of the waveguide or a lens structure in order to expand the optical beam for more tolerant alignment. However, including a taper structure as part of the optical waveguide requires design change of the optical chips which prohibits the use of widely available and proven commercial chips as well as, in many cases, harms device performance. The lens which can be used in such condition cannot be made monolithically on the optical bench and has to be installed separately which introduces additional alignment error during the assembling. These and similar methods have been proposed but none of them is being adopted in mass production due to above-stated issues.

SUMMARY OF THE INVENTION

Optical devices according to embodiments of the present invention significantly increase the alignment tolerance in the in-plane direction perpendicular to waveguide propagation during flip-chip bonding.

One embodiment is an optical device. The optical device comprises an optical bench and an optical chip. The optical bench comprises multiple optical waveguides formed on its first side. The optical chip comprises multiple optical waveguides formed on its first side. The optical chip is flip-chip bonded onto the optical bench with its first side towards the first side of the optical bench. The waveguides on the optical chip and the waveguides on the optical bench are in good alignment in out-of-plane direction guaranteed by the spacer structure formed on the first side of the optical bench as stated earlier. The distance between the waveguides on the optical bench are designed to be slightly different from the distance between the waveguides on the optical chip which usually is a pre-designed value under certain conventions. The distance between the waveguides on the optical bench is properly designed such that under reasonable misalignment between the optical chip and the optical bench in the in-plane direction perpendicular to waveguide propagation one can always find one of the waveguides is aligned sufficiently well with the corresponding waveguide on the optical chip.

Another embodiment is an optical device comprising an optical bench and two optical chips. The optical bench comprises multiple optical waveguides formed on its first side. The two optical chips comprise multiple optical waveguides formed on their first side, respectively. The two optical chips are flip-chip bonded to the optical bench with good out-of-plane alignment guaranteed by the spacer structure formed on the first side of the optical bench. The distance between the waveguides on the first optical chip is designed to be slightly different from the distance between the waveguides on the second optical chip. The distance between the waveguides on the second optical chip is properly designed such that under reasonable misalignment between the first optical chip and the second optical chip in the in-plane direction perpendicular to waveguide propagation one can always find one of the waveguides is sufficiently well aligned with the corresponding waveguide on the optical chip.

The idea behind the invention is based on a finding in practice that in many cases, the overall cost of a hybrid integrated optical device or system is dominated by the yield of high precision optical assembling over optical chips, especially in high volume market field where the required optical chips become commodities. A good production model can be established by balancing the use of a multi-waveguide (i.e. multi-channel) optical chip, whose cost is roughly scaled with the number of waveguide channels, and the significant improvement of assembling yield due to larger alignment tolerance during flip-chip bonding.

Additional features and advantages of the invention will be set forth in the descriptions that follow and in part will be apparent from the description, or may be learned by practice of the invention. The objectives and other advantages of the invention will be realized and attained by the structure particularly pointed out in the written description and claims thereof as well as the appended drawings.

It is to be understood that both the foregoing general description and the following detailed description are exemplary and explanatory and are intended to provide further explanation of the invention as claimed.

DETAILED DESCRIPTION OF THE PREFERRED EMBODIMENTS

The invention relates to an optical device with hybrid integrated optical waveguide chips. In particular, the invention relates to an optical device using flip-chip method to hybrid integrate one or more optical chips on an optical bench and both the chips and the optical bench include multiple optical waveguides with different distances to compensate alignment errors.

Figure 1A:
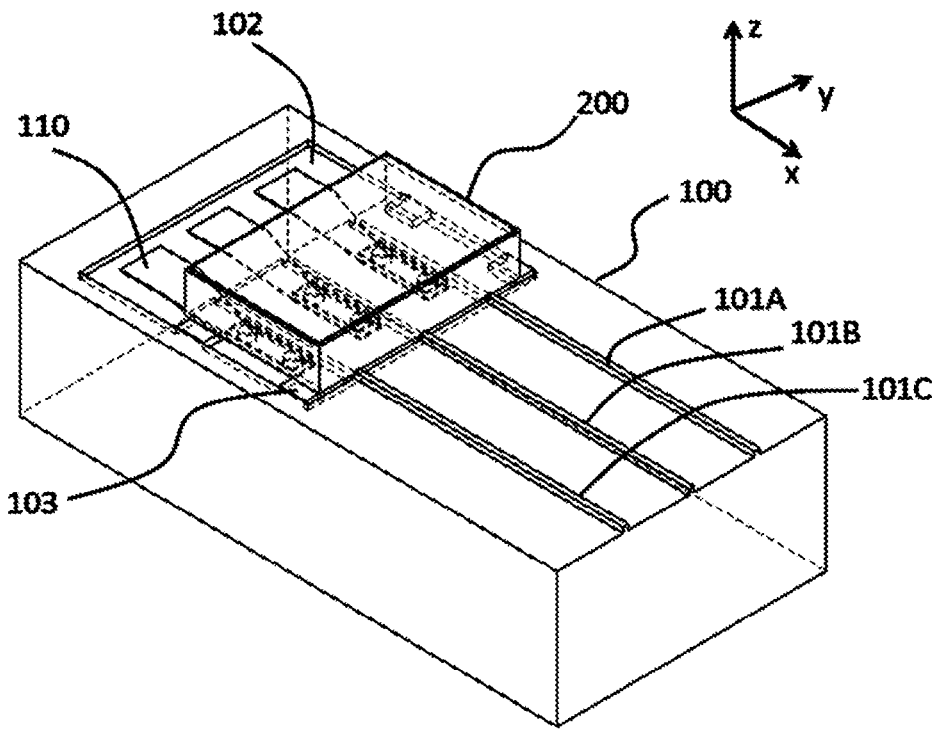
FIG. 1A is a perspective view illustrating a hybrid integrated optical device according to an embodiment of the present invention.
Figure 1B:
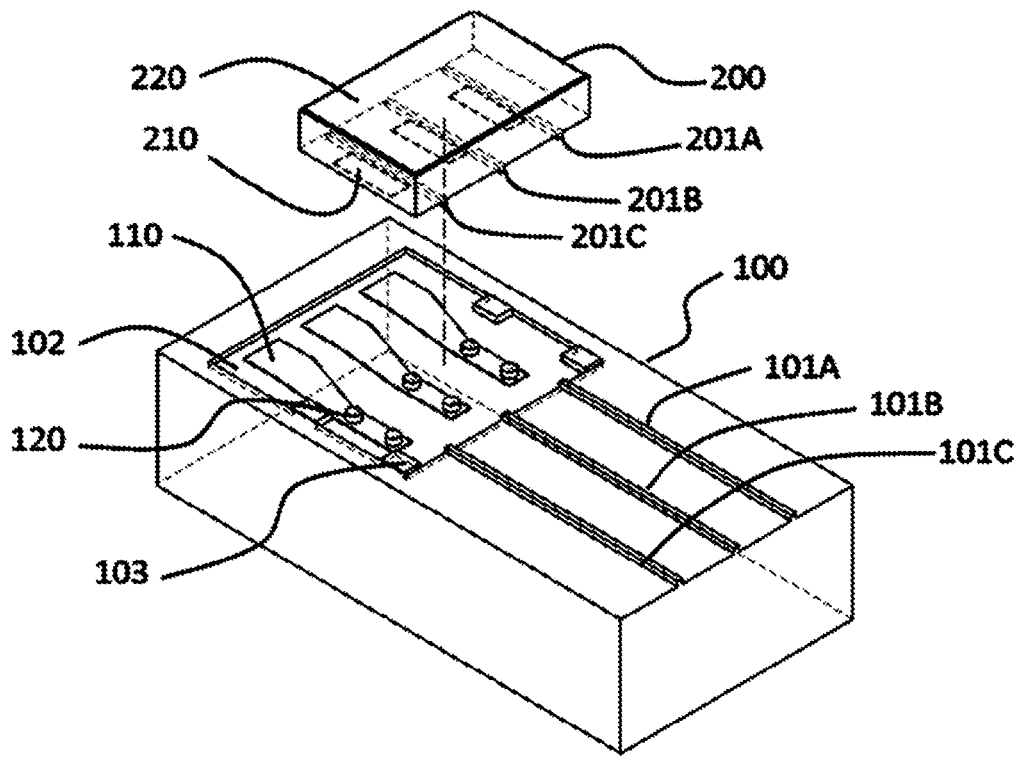
FIG. 1B is an exploded view illustrating the hybrid integrated optical device shown in FIG. 1A.

An embodiment of the present invention is described with reference to FIGS. 1A-1B. The optical device comprises an optical bench with multiple optical waveguides, an etched trench, etched spacers, metal traces and micro solders and a flip-chip bonded optical chip with multiple optical waveguides. FIG. 1A is a perspective view illustrating the hybrid integrated optical device while FIG. 1B is an exploded view. The components are drawn in a way as if they were transparent for the purpose of easy observation of structures behind (structures behind other structures are shown in dashed lines). The hybrid integrated optical device comprises an optical bench 100 and a flip-chip bonded optical chip 200. The optical bench 100 can be made by any semiconductor or insulating materials including, but not limited to, silicon, silica, and indium phosphide. The optical bench 100 comprises a first side and a second side generally opposite to the first side. The optical bench 100 further comprises multiple optical waveguides 101A-101C on the first side formed by etching or deposition technologies. The waveguides 101A-101C are made of optical transparent materials including, but not limited to, silicon, silicon nitride, and indium gallium arsenide phosphide. The optical bench 100 further comprises a trench 102 and multiple spacers 103 formed by etching technologies. The depth of both the trench 102 and spacers 103 are precisely controlled using semiconductor processing techniques. The optical bench 100 further comprises metal traces 110 and micro solders 120 in the trench 102 for the purpose of electrically connecting to the flip-chip bonded optical chip. Both end facets of the waveguides 101A-101C, i.e. the facet facing the trench and the facet located farther away from the trench at the far end of the optical bench, are coated with anti-reflection coating to reduce light reflection.

The optical chip 200 can be made by any semiconductor or insulating materials including, but not limited to, silicon, silica, and indium phosphide. The optical chip 200 comprises a first side and a second side generally opposite to the first side. The optical chip 200 further comprises multiple optical waveguides 201A-201C on the first side. The optical chip 200 can be an active device which requires external electrical power to operate. An active device can include, but not limited to, laser, modulator, photodetector, amplifier, attenuator, and switch. The optical chip 200 further comprises electrodes 210 to receive external electrical power.

The optical chip 200 is bonded on to the optical bench 100 though a flip-chip process in which the optical chip 200 is flipped thus its first side faces the first side of the optical bench 100. The optical chip 200 is then aligned to the optical bench 100 by comparing alignment marks on the first side of the optical chip and the first side of the optical bench. The alignment marks are not illustrated in the figures. The optical chip 200 is then push on to the optical bench 100 while heating up either or both the chip 200 and bench 100. The optical chip is stopped by the spacer 103 from further descending. The micro solders 120 are melted to form electrical connection and mechanical bonding between the metal trace 110 and the electrode 210.

Figure 2:
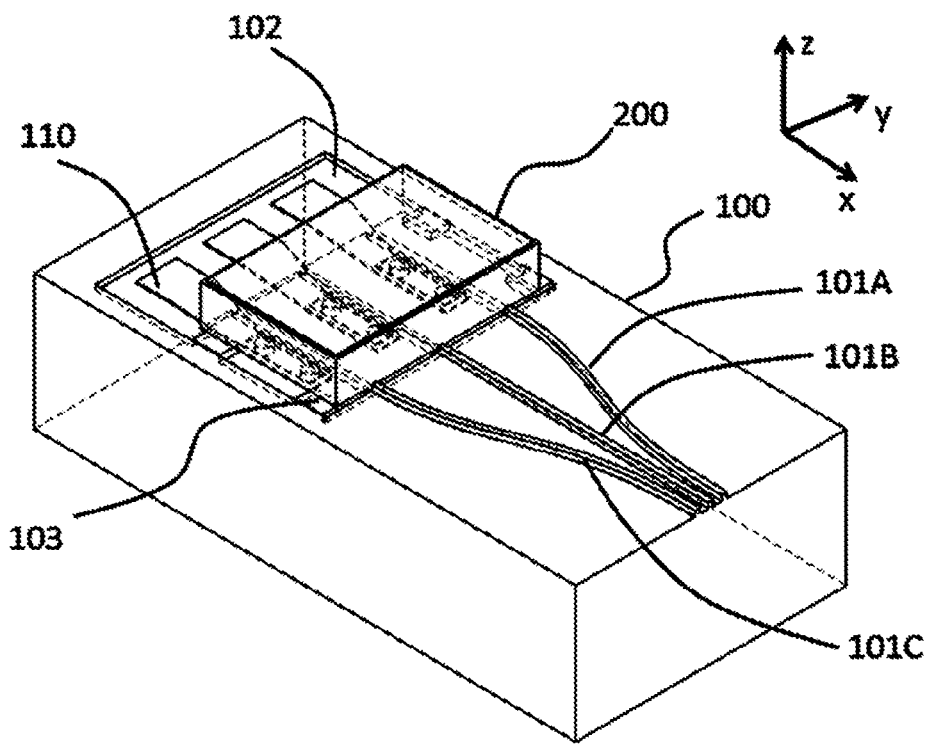
FIG. 2 is a perspective view illustrating a hybrid integrated optical device according to an embodiment of the present invention.

Another embodiment is described with reference to FIG. 2. This embodiment is similar to the one shown in FIG. 1A with the exception of different waveguides configuration on the optical bench 100. In this embodiment, the waveguides 101A-101C are bent or curved to approach each other at the end of the optical bench 100. The closely arranged waveguide ends can facilitate packaging design as the output light location is approximately the same no matter which waveguide light comes out.

Figure 3:
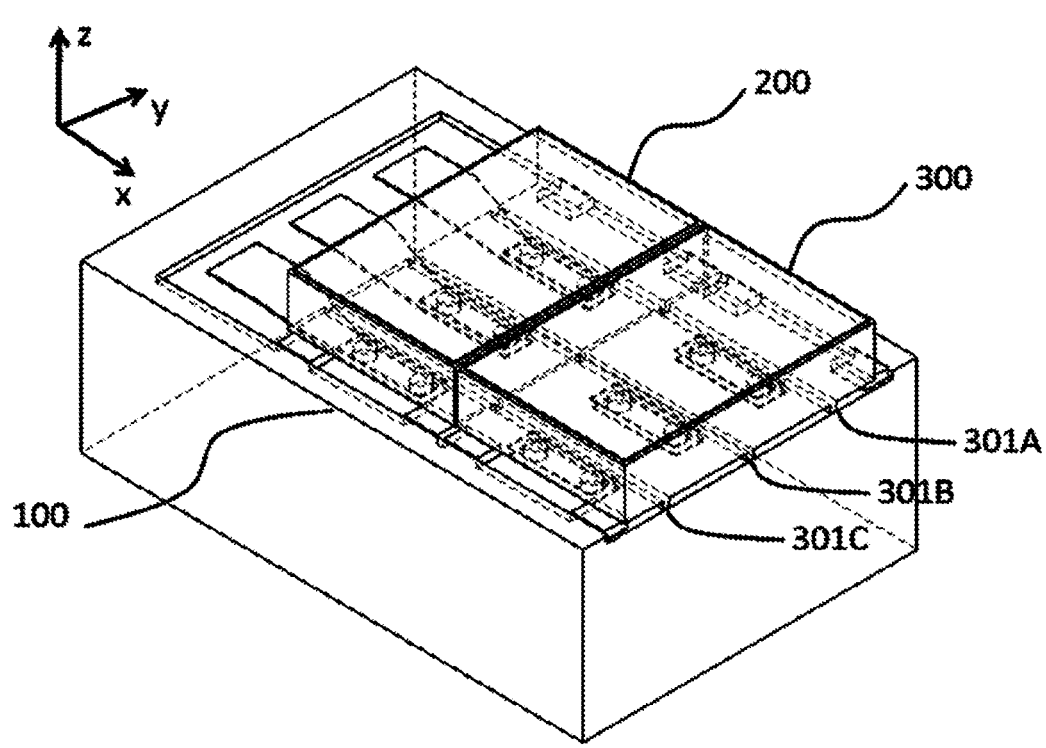
FIG. 3 is a perspective view illustrating a hybrid integrated optical device according to an embodiment of the present invention. The optical device comprises an optical bench with two etched trenches, etched spacers, metal traces and micro solders and two flip-chip bonded optical chips both with multiple optical waveguides, respectively.

Another embodiment is described with reference to FIG. 3. This embodiment comprises an optical bench 100 and two optical chips 200 and 300. In this embodiment, the optical waveguides 101A-101C in the two previous two embodiments are replaced with the optical waveguides 301A-301C on the second optical chip 300. The two optical chips 200 and 300 are both aligned with and flip-chip bonded to the optical bench 100, in respective etched trenches. In hybrid integration, the goal of the flip-chip bonding is to accurately align the waveguides between chips (or bench) so light can transmit from one waveguide to another with minimal optical loss. The optical alignment is explained in cross-sectional views in FIG. 4A (parallel to the x-z plane of FIG. 1A) and FIG. 4B (parallel to the x-y plane of FIG. 1).

Figure 4A:
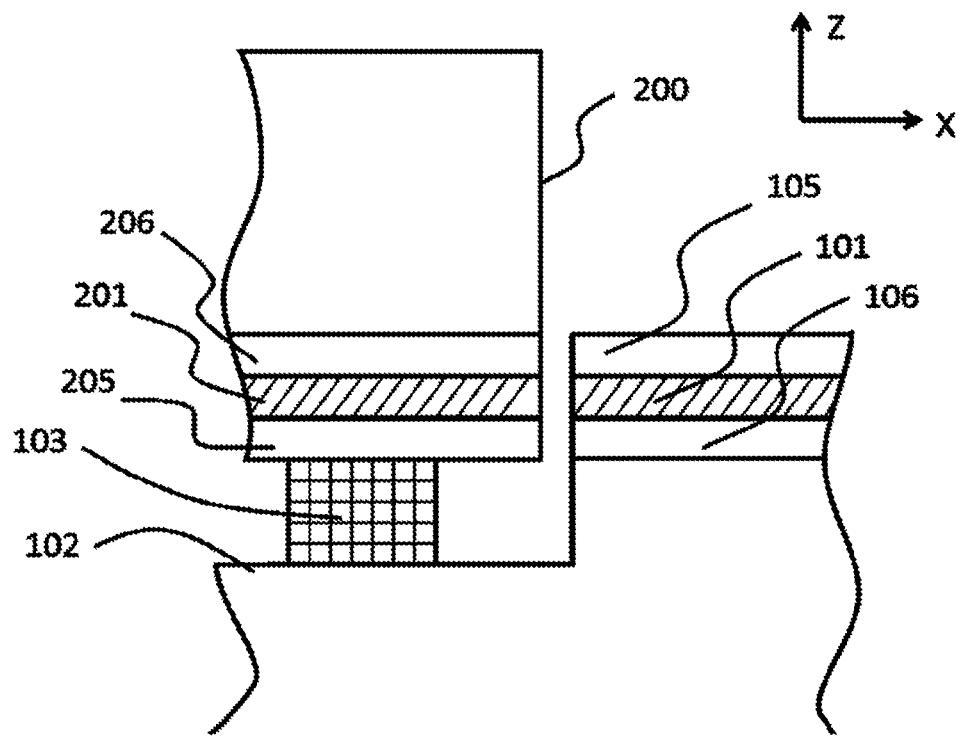
FIG. 4A is a cross-sectional view illustrating the out-of-plane alignment between a waveguide on the optical device and a waveguide on the optical bench (or on the other optical device) of the hybrid integrated optical device shown in FIG. 1 and FIG. 2 (or in FIG. 3).

FIG. 4A illustrates the out-of-plane (the direction perpendicular to the first side of the optical bench or the optical device) alignment between two waveguides. In some embodiments (e.g. the ones in FIG. 1 and FIG. 2), one waveguide 201 (which may be any one of 201A-201C) belongs to the optical device 200 and the other waveguide 101 (which may be the corresponding one of 101A-101C) belongs to the optical bench 100 while in other embodiments (e.g. the one in FIG. 3), the waveguide 101 belongs to the second optical device 300. A waveguide (e.g. 201) is always surrounded by cladding layers (e.g. 205 and 206) which has lower refractive index to make light confined in the waveguide core layer 201. The thicknesses of these cladding layers are usually well defined by semiconductor or other wafer processing techniques, so the distance between the optical waveguide (e.g. 201) and the surface of the cladding layer (e.g. 205) is well controlled. By placing an optical chip 200 upside down onto an optical bench and with the pre-defined spacer 103 on the optical bench, the optical waveguide alignment in the out-of-plane direction of the optical chip and the optical bench can be precisely controlled. The optical bench includes precisely etched trench 102 and spacer 103. The spacer 103 serves as a stop for the flipped chip when it is pushed onto the optical bench. With precisely controlled trench 102 depth and spacer 103 height, the waveguide 101 and waveguide 201 can be aligned accurately in the out-of-plane direction.

Figure 4B:
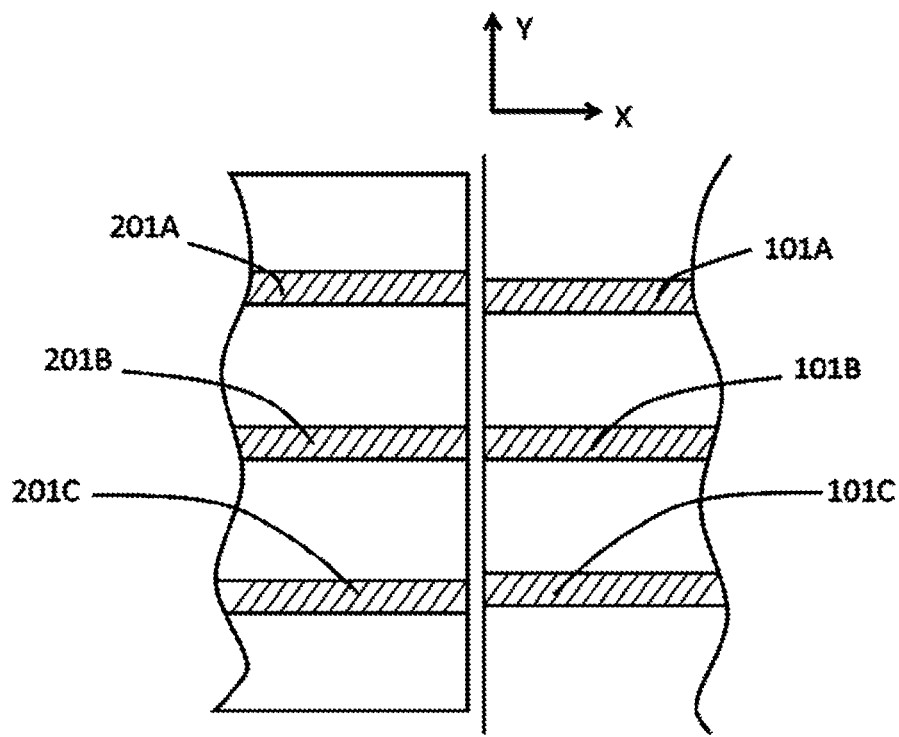
FIG. 4B is a cross-sectional view illustrating the in-plane alignment between a waveguide on the optical device and a waveguide on the optical bench (or on the other optical device) of the hybrid integrated optical device shown in FIG. 1 and FIG. 2 (or in FIG. 3).

FIG. 4B illustrates the in-plane (in the plane parallel to the first side of the optical bench or the optical device) alignment between two waveguides. In some embodiments (e.g. the ones in FIG. 1 and FIG. 2), one set of waveguides 201A-201C belong to the optical device 200 and the other set of waveguides 101A-101C belong to the optical bench 100 while in other embodiments (e.g. the one in FIG. 3), the set of waveguides 101A-101C belong to the second optical device 300. The alignment in in-plane waveguide propagation direction (indicated by "X" direction in FIG. 4B) has relatively large tolerance while the in-plane direction perpendicular to waveguide propagation (indicated by "Y" direction in FIG. 4B) requires accurate alignment, especially for small optical waveguides such as those in lasers. The latter one is the focus in the embodiments of this invention. In the illustrated example in FIG. 4B, the distance between adjacent ones of the waveguides 101A-101C (pitch) is slightly smaller (or larger) than the distance between adjacent ones of the waveguides 201A-201C. In this case, when there is misalignment in either positive or negative "Y" direction, one can always find one of the waveguides 101A-101C with the best alignment with the corresponding waveguide among waveguides 201A-201C. By properly designing the distance difference, a certain coupling loss within the system alignment tolerance can be guaranteed.

Figure 5A:
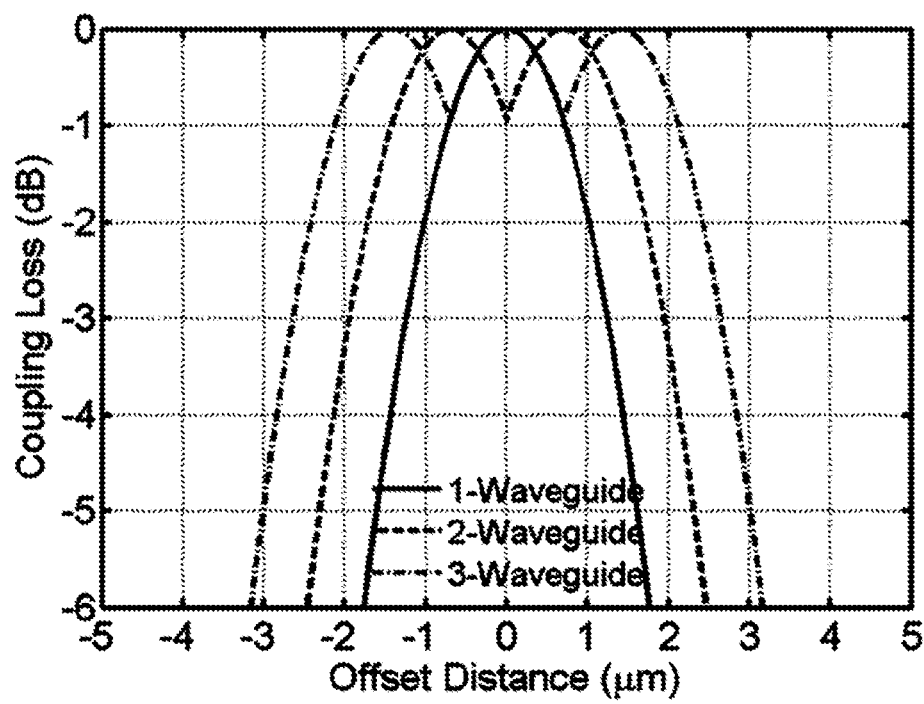
FIG. 5A is a plot illustrating the optical loss versus in-plane misalignment of an example.
Figure 5B:
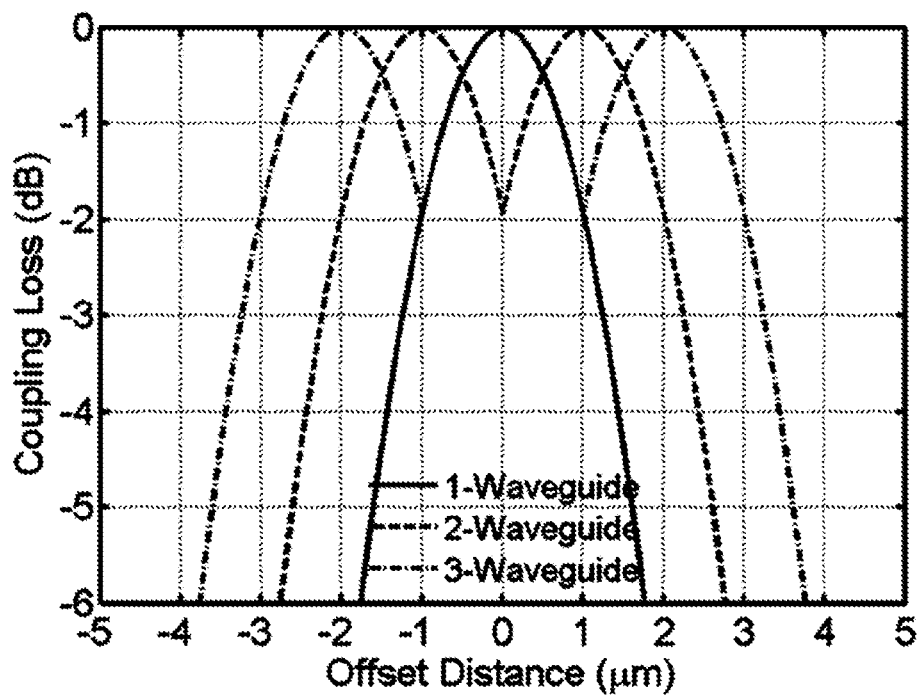
FIG. 5B is a plot illustrating the optical loss versus in-plane misalignment of another example.

FIGS. 5A and 5B illustrate the optical loss versus in-plane misalignment of two exemplary designs. In both cases, all the waveguides are designed to have a mode size of 1.5 micrometers which is a typical mode size of lasers emitting 1.55 micrometers wavelength light. In the case shown in FIG. 5A, the difference between the pitches of two groups of waveguides (i.e. 101A-101C and 201A-201C) is 0.7 micrometer. The solid curve in FIG. 5A shows the coupling loss versus misalignment (offset) when there is only one pair of waveguides to align with each other. It can be seen that the coupling loss increases quickly with misalignment and if −1 dB coupling loss is the maximal loss allowed then the misalignment must be controlled within +/−0.8 micrometer which is very difficult to repeatedly achieve even with a state-of-art flip-chip bonder and carefully carried bonding process. The dashed curve in FIG. 5A shows the coupling loss with two waveguides for each group. The coupling loss is the better of the two waveguides in varying misalignment conditions. It can be seen that the misalignment tolerance range corresponding to −1 dB coupling loss is extended to +/−1.5 micrometers. And the misalignment tolerance range is further extended to +/−2.1 micrometers with three waveguides in each group as shown by the dash-dotted curve in FIG. 5A. As stated in the background section earlier, our experiment showed +/−2 micrometers is a reasonable range that can be achieved reliably in practice. Therefore in this particular example, a three-waveguide design can be adopted.

FIG. 5B shows another example where the difference between the pitches of two groups of waveguides (i.e. 101A-101C and 201A-201C) is 1.0 micrometer. With the maximal allowed coupling loss of −2 dB a two-waveguide design can satisfy the corresponding +/−2 micrometers misalignment range. And a three-waveguide design even extends the misalignment tolerance to +/−3 micrometers. In theory, one can keep increasing the number of waveguides to further extend misalignment tolerance, however, this will increase the cost of the optical chip and/or the optical bench which is usually scaled with the chip size. In practice, a design with an appropriate number of waveguides may be chosen by balancing the coupling benefit and associated cost increase.

After the optical chips 200, 300 are bonded on to the optical bench 100 though the flip-chip process, only one of the multiple (e.g. three) waveguides, i.e. the one that has the best alignment with the corresponding waveguide, is used for actual signal transmission. Optical tests may be performed after flip-chip bonding to determine one waveguide with the best alignment result. For example, if the optical device is a laser chip with three waveguides (i.e. a 3-channel laser array), after flip-chip bonding to an optical bench, the output light from the bench may be measured out of the three optical bench waveguides and the best channel will be used.

In this optical device, some waveguides are not used; this is a tradeoff by "sacrificing" some waveguides to increase alignment tolerance. Cost-benefit analyses tend to show that using multiple waveguides as disclosed in the embodiments here decreases the overall assembling cost by increasing yield.

It will be apparent to those skilled in the art that various modification and variations can be made in the optical system and related fabrication methods of the present invention without departing from the spirit or scope of the invention. Thus, it is intended that the present invention cover modifications and variations that come within the scope of the appended claims and their equivalents.

What is claimed is:

1. A hybrid integrated optical device comprising:
   an optical bench having a first side and a second side generally opposite to the first side and a plurality of optical waveguides formed at the first side of the optical bench, the plurality of optical waveguides having a corresponding plurality of ends located on a facet of the optical bench; and
   an optical chip having a first side and a second side generally opposite to the first side and a plurality of optical waveguides formed at the first side of the optical chip, the plurality of optical waveguides having a corresponding plurality of ends located on a facet of the optical chip;
   wherein the optical chip is aligned and flip-chip bonded onto the optical bench with the first side of the optical chip facing the first side of the optical bench and the end of each of the plurality of optical waveguides of the optical chip faces the end of a corresponding one of the plurality of optical waveguides of the optical bench;
   wherein a distance between the ends of adjacent ones of the plurality of optical waveguides of the optical bench is different from a distance between the ends of adjacent ones of the plurality of optical waveguides of the optical chip by a predetermined amount.

2. The hybrid integrated optical device of claim 1, wherein the optical bench comprises:
an etched trench formed at the first side of the optical bench to receive the optical chip through flip-chip bonding process.

3. The hybrid integrated optical device of claim 2, wherein the etched trench of the optical bench comprises:
a plurality of spacer structures formed on a bottom surface of the etched trench to define a height of the optical chip perpendicular to the first side of the optical chip during flip-chip bonding process; and
a plurality of metal traces and a plurality of micro solders disposed on the bottom surface of the etched trench to electrically connect to a plurality of metal electrodes at the first side of the optical chip.

4. The hybrid integrated optical device of claim 1, wherein the optical chip comprises:
a plurality of metal electrodes disposed at the first side of the optical chip to receive external electrical power and signal to operate the optical chip.

5. The hybrid integrated optical device of claim 1, wherein the plurality of optical waveguides of the optical bench form bent shapes to approach each other at an edge of the optical bench.

6. The hybrid integrated optical device of claim 1, wherein the plurality of waveguides of the optical bench comprises:
a first facet facing the etched trench coated with thin films with a predetermined reflectivity; and
a second facet, located farther away from the etched trench at a far end of the optical bench, coated with thin films with a predetermined reflectivity.

7. A hybrid integrated optical device comprising:
an optical bench having a first side and a second side generally opposite to the first side;
a first optical chip having a first side and a second side generally opposite to the first side and a plurality of optical waveguides formed at the first side of the first optical chip, the plurality of optical waveguides having a corresponding plurality of ends located on a facet of the first optical chip; and
a second optical chip having a first side and a second side generally opposite to the first side and a plurality of optical waveguides formed at the first side of the second optical chip, the plurality of optical waveguides having a corresponding plurality of ends located on a facet of the second optical chip;
wherein the first optical chip is aligned and flip-chip bonded onto the optical bench with the first side of the first optical chip facing the first side of the optical bench, and the second optical chip is aligned and flip-chip bonded onto the optical bench with the first side of the second optical chip facing the first side of the optical bench, wherein the end of each of the plurality of optical waveguides of the first optical chip faces the end of a corresponding one of the plurality of optical waveguides of the second optical chip; and
wherein a distance between the ends of adjacent ones of the plurality of optical waveguides of the second optical chip is different from a distance between the ends of adjacent ones of the plurality of optical waveguides of the first optical chip by a predetermined amount.

8. The hybrid integrated optical device of claim 7, wherein the optical bench comprises:
a first etched trench formed at the first side of the optical bench to receive the first optical chip through flip-chip bonding process; and
a second etched trench formed at the first side of the optical bench to receive the second optical chip through flip-chip bonding process.

9. The hybrid integrated optical device of claim 8, wherein the first etched trench of the optical bench comprises:
a plurality of spacer structures formed on a bottom surface of the first etched trench to define a height of the first optical chip perpendicular to the first side of the first optical chip during flip-chip bonding process; and
a plurality of metal traces and a plurality of micro solders disposed on the bottom surface of the first etched trench to electrically connect to a plurality of metal electrodes at the first side of the first optical chip.

10. The hybrid integrated optical device of claim 8, wherein the second etched trench of the optical bench comprises:
a plurality of spacer structures formed on a bottom surface of the second etched trench to define a height of the second optical chip perpendicular to the first side of the second optical chip during flip-chip bonding process; and
a plurality of metal traces and a plurality of micro solders disposed on the bottom surface of the second etched trench to electrically connect to a plurality of metal electrodes at the first side of the second optical chip.

11. The hybrid integrated optical device of claim 7, wherein the first optical chip comprised:
a plurality of metal electrodes disposed at the first side of the first optical chip to receive external electrical power and signal to operate the first optical chip.

12. The hybrid integrated optical device of claim 7, wherein the second optical chip comprises:
a plurality of metal electrodes disposed at the first side of the second optical chip to receive external electrical power and signal to operate the second optical chip.

13. A method for making a hybrid integrated optical device, comprising:
providing an optical bench having a first side and a second side generally opposite to the first side and a plurality of optical waveguides formed at the first side of the optical bench, the plurality of optical waveguides having a corresponding plurality of ends located on a facet of the optical bench;
providing an optical chip having a first side and a second side generally opposite to the first side and a plurality of optical waveguides formed at the first side of the optical chip, the plurality of optical waveguides having a corresponding plurality of ends located on a facet of the optical chip,
wherein a distance between the ends of adjacent ones of the plurality of optical waveguides of the optical bench is different from a distance between the ends of adjacent ones of the plurality of optical waveguides of the optical chip by a predetermined amount;
aligning and flip-chip bonding the optical chip onto the optical bench with the first side of the optical chip facing the first side of the optical bench and the end of each of the plurality of optical waveguides of the optical chip faces the end of a corresponding one of the plurality of optical waveguides of the optical bench; and
selecting one of the plurality of optical waveguides of the optical bench and the corresponding optical waveguide of the optical chip, which has a better alignment to each other than alignment of all other ones of the plurality of optical waveguides of the optical bench to their corresponding optical waveguides of the optical chip, as a light transmitting channel.

\* \* \* \* \*